United States Patent
Tiefenböck

(10) Patent No.: US 9,061,388 B2
(45) Date of Patent: Jun. 23, 2015

(54) SYSTEM HAVING TWO OSCILLATION COMPONENTS FOR MACHINING A WORKPIECE

(75) Inventor: Herbert Tiefenböck, Andorf Schärding (AT)

(73) Assignee: EV Group GmbH, St. Florian Am Inn (AT)

( * ) Notice: Subject to any disclaimer, the term of this patent is extended or adjusted under 35 U.S.C. 154(b) by 136 days.

(21) Appl. No.: 13/994,161

(22) PCT Filed: Dec. 19, 2011

(86) PCT No.: PCT/EP2011/073185
§ 371 (c)(1),
(2), (4) Date: Jun. 14, 2013

(87) PCT Pub. No.: WO2012/084779
PCT Pub. Date: Jun. 28, 2012

(65) Prior Publication Data
US 2013/0259592 A1    Oct. 3, 2013

(30) Foreign Application Priority Data

Dec. 21, 2010   (DE) .......................... 10 2010 055 288

(51) Int. Cl.
*B23Q 1/34* (2006.01)
*B23P 25/00* (2006.01)
*B23C 3/00* (2006.01)
*B24B 1/04* (2006.01)

(52) U.S. Cl.
CPC .......... *B23Q 1/34* (2013.01); *Y10T 409/303808* (2015.01); *Y10T 409/305488* (2015.01); *B24B 1/04* (2013.01); *B23P 25/00* (2013.01); *B23C 3/00* (2013.01)

(58) Field of Classification Search
CPC .......... B06B 1/06; B23B 29/125; B23Q 1/34; B24B 1/04; Y10T 409/305488
USPC ............... 269/58; 409/132, 162; 451/28, 133, 451/170, 199, 212, 264, 272, 305, 314, 320, 451/366, 392, 910
See application file for complete search history.

(56) References Cited

U.S. PATENT DOCUMENTS

| 5,165,205 A | 11/1992 | Nakagawa et al. ............. 51/230 |
| 7,508,116 B2 * | 3/2009 | Liu ................................ 310/328 |
| 7,727,050 B2 * | 6/2010 | Sanuki et al. .................... 451/11 |

FOREIGN PATENT DOCUMENTS

| DE | 38 79 448 | 7/1993 | ................ B24B 1/04 |
| EP | 0 323 518 | 7/1989 | ................ B24B 1/04 |
| EP | 1 762 305 | 3/2007 | ................ B06B 1/06 |

OTHER PUBLICATIONS

International Search Report for International Application No. PCT/EP2011/073185, Mar. 28, 2012.

* cited by examiner

*Primary Examiner* — Timothy V Eley
(74) *Attorney, Agent, or Firm* — Kusner & Jaffe

(57) ABSTRACT

A workpiece holding fixture for receiving a workpiece and for use in a device for the machining of a workpiece with: a tool holding fixture for receiving the tool, a workpiece holding fixture for receiving the workpiece, characterized in that, during the machining, at least one first oscillation component in a Z-direction and a second, in particular simultaneous, oscillation component in the X- and/or Y-direction can be introduced by means of oscillation components.

14 Claims, 3 Drawing Sheets

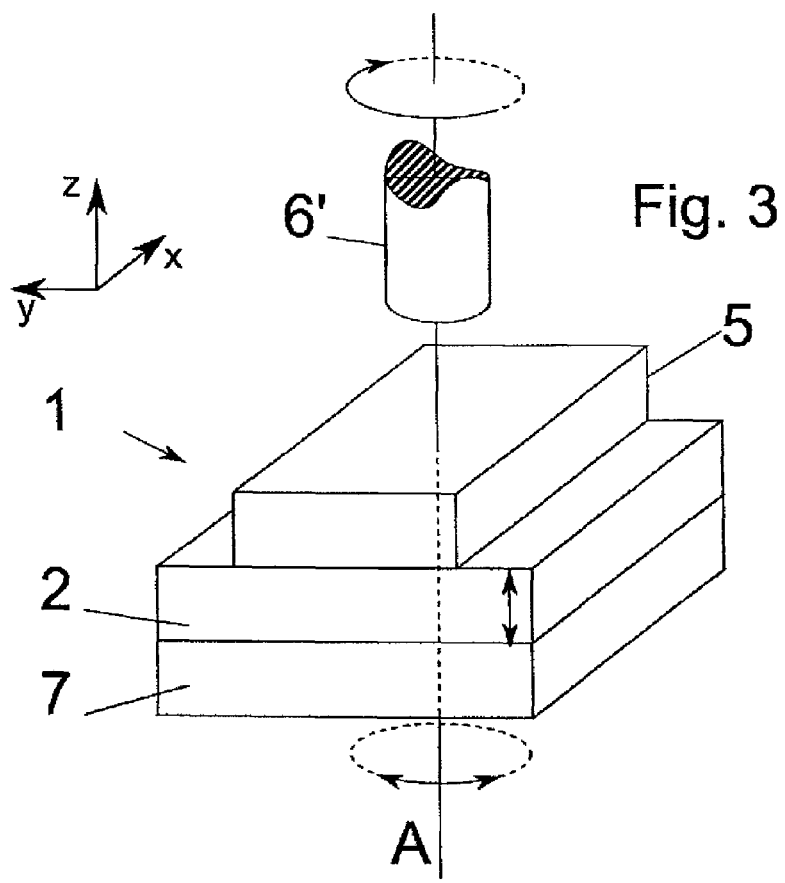

SYSTEM HAVING TWO OSCILLATION COMPONENTS FOR MACHINING A WORKPIECE

FIELD OF THE INVENTION

The present invention relates to a device for the machining of a workpiece and a workpiece holding fixture.

BACKGROUND OF THE INVENTION

Known devices for the metal cutting, in particular milling, of workpieces are capable, during the machining process with oscillations of the tool, of producing improved milling properties during the tool rotation, wherein frequencies of 18,000 Hz to 20,000 Hz are used.

In particular, extremely hard workpieces, such as for example SiC, SiN or $B_4N$, present problems with such devices, since they lead to extreme wear on the tools.

The object of the present invention, therefore, is to improve a generic device in such a way that reduced tool wear and correspondingly longer service lives as well as an increase in the processing rate, i.e. the metal cutting volume or the removal volume per unit of time, can be achieved.

This object is solved with the features of the independent claims. Advantageous developments of the invention are stated in the sub-claims. All combinations of at least two of the features stated in the description, the claims and/or the figures also fall within the scope of the invention. In the stated value ranges, values lying within the stated limits are also deemed to be disclosed as limiting values and can be claimed in any combination.

SUMMARY OF THE INVENTION

The basic idea of the invention is to achieve an improved metal cutting effect by means of process-controlled, multi-dimensionally coupled and synchronised axial oscillation. The invention is therefore particularly well suited for hard and ultra-hard materials, such as for example oxide ceramics, non-oxide ceramics, hard metals or glass. According to the invention, a multi-axial oscillating relative movement between the workpiece holding fixture and therefore the workpiece and the tool takes place when the tool engages in the workpiece, i.e. during metal cutting. The microstructure of the workpiece becomes loaded in such a way that an improved metal cutting effect is achieved.

On account of the likewise usually multi-axial machining possibilities of the tool through multi-axial, coupled and synchronised relative movement between the tool and the workpiece, the X-, Y- and Z-direction are related to the respective processing face. The latter is not necessarily in the normal orientation shown in the figures, but in the ideal case is arbitrary, in order to permit individual machining of the workpiece. A machining plane in the X- and Y-direction and a machining direction or also a feed direction of the tool and/or of the workpiece, i.e. a movement of the tool and/or of the workpiece towards one another, is thus provided for.

A micro-chisel effect or a micro-percussion effect is thus produced by the invention, in particular on account of the first oscillation component provided in the Z-direction, i.e. the feed direction, a transverse component also being introduced by the second oscillation component.

The chisel effect of the tool is produced by the oscillation elements, wherein the predominant oscillation component or amplitude is preferably provided in the Z-direction, i.e. in the feed direction.

The introduction of the oscillation components takes place through, in particular axis-related, oscillation damping (passive) and/or through, in particular axis-related, oscillation excitation (active). According to the invention, the means of introduction are provided in particular on the tool.

According to the invention, a passive control of the introduction of the respective oscillation component takes place by the fact that an oscillation excited through the machining of the workpiece by the tool is reduced, modulated or damped in such a way that a preselected oscillation component with a defined amplitude, frequency and/or phase is produced.

An active control of the introduction of the respective oscillation component takes place through an additional, in particular externally excited, oscillation, which is superimposed by any existing oscillation excited through the machining by the tool itself.

According to the invention, the active control can take place, particularly in the case of programmable, multi-axially oscillating tools, by suitable programming of the control, wherein defined oscillation components with defined amplitudes, frequencies and/or phases are generated by the programmed movements during the machining.

Oscillation frequencies of the respective (damped and/or externally excited) oscillation component are preferably less than 1 kHz, in particular less than 500 Hz, preferably greater than 10 Hz.

According to an advantageous embodiment of the invention, provision is made such that oscillation amplitudes and/or oscillation frequencies of the first and/or second oscillation components can be adjusted, in particular independently of one another. In this way, the device can be adjusted for the given material of the workpiece to be machined or the combination of the materials of the tool and the workpiece.

If the oscillation frequencies can be adjusted to less than 1 GHz, in particular <100 MHz, preferably <1 MHz, more preferably <100 kHz, still more preferably <1 kHz, ideally between 100 Hz and 600 Hz, an ever better metal cutting effect is achieved.

By the fact that the oscillation amplitudes can be adjusted, simultaneously or independently, to <100 µm, in particular <10 µm, preferably <1 µm, still more preferably <100 nm and ideally between 1 nm and 10 nm, the metal cutting effect of the device is further increased. It is particularly advantageous if, according to an embodiment of the invention, the oscillation components are generated by piezo elements.

The oscillation amplitude in the X- and/or Y-direction is preferably at most as large as the average dimensions of microstructures, in particular diamonds, in the surface of the tool.

BRIEF DESCRIPTION OF THE DRAWINGS

Further advantages, features and details of the invention emerge from the description of preferred examples of embodiment and on the basis of the drawings. In the drawings:

FIG. 3 shows a third embodiment of the device according to the invention in a diagrammatic perspective view and FIGS. 4a to 4c show a representation of the mode of functioning of the oscillation elements.

DETAILED DESCRIPTION OF THE INVENTION

Identical or identical acting components/features are denoted by the same reference numbers in the figures.

Figure 1:
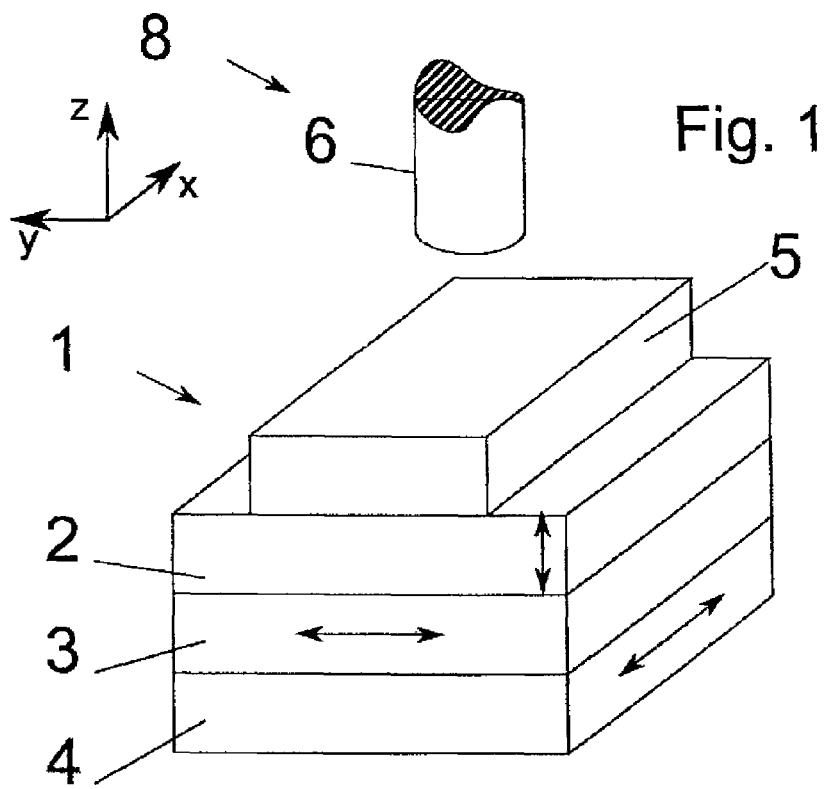
FIG. 1 shows a first embodiment of the device according to the invention in a diagrammatic perspective view.

The device according to FIG. 1 is a machine tool with a workpiece holding fixture 1 for the holding and movement of a workpiece 5 with respect to a tool 6 for the machining of workpiece 5.

In the embodiment according to FIG. 1, workpiece holding fixture 1 comprises a first oscillation element 2 for performing an oscillatory movement in the Z-direction. The Z-direction corresponds to a movement in the direction of tool 6 or away from the latter. Oscillation element 2 has, in particular, a single degree of freedom in the Z-direction, and accordingly performs a back-and-forth movement, in particular a linear movement, in the Z-direction.

Two further oscillation elements 3, 4 connected to oscillation element 2 move or oscillate workpiece 5 in an X-direction or a Y-direction, wherein the X-, the Y- and the Z-direction each run normal to one another. Oscillation elements 3, 4 also have a single degree of freedom.

The movement of oscillation elements 2, 3, 4 takes place in the form of oscillations with a given oscillation amplitude and a given oscillation frequency, which can be adjusted for each oscillation element 2, 3, 4, in particular independently of one another. In this way, a multi-axial oscillation excitation of workpiece 5 fixed to workpiece holding fixture 1 can be generated, wherein according to the invention at least a first oscillation component is provided in the Z-direction by oscillation element 2 and a second oscillation component in the X-direction by drive component 4 and/or in the Y-direction by drive component 3, so that the oscillations of the first and second oscillation component have a constant phase relationship with one another during the whole machining process.

Oscillation elements 2, 3, 4 comprise, in particular, piezo elements 8, 9 for the oscillation excitation. The oscillation excitation can alternatively be generated by spindles with eccentric shafts, depending on the required oscillation frequency and/or oscillation amplitude.

It is particularly advantageous if the oscillation components can be adjusted simultaneously, in particular in respect of their oscillation phases and/or their oscillation frequency and/or their oscillation amplitudes. In other words: The oscillation phases and/or their oscillation frequency and/or their oscillation amplitudes are designed so as to operate in a synchronised manner.

Independently of oscillation elements 2, 3, 4, drive means (not represented here) for the movement of the workpiece independently of the oscillation components are provided according to the intended machine tool or according to the desired machining.

Figure 2:
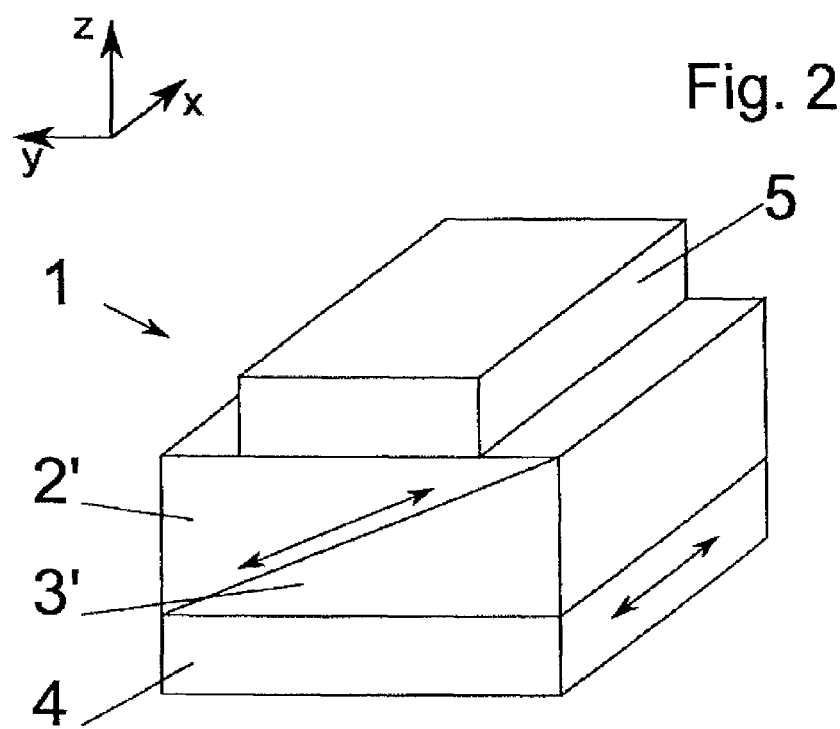
FIG. 2 shows a second embodiment of the device according to the invention in a diagrammatic perspective view.

In the preferred embodiment of the invention shown in FIG. 2, oscillation elements 2', 3' are guided against one another in such a way that, with a relative movement of oscillation elements 2' and 3' towards one another, an inclined oscillation component is generated which simultaneously produces in each case at least one oscillation component in the X- and Y-direction or in the X- and Z-direction or in the Y- and Z-direction, as in the example represented in FIG. 3. A combination of two oscillation components thus takes place as a result of the inclination with respect to the machining direction or also the feed direction of the tool and/or the workpiece, so that an inclined oscillation component with an inclined oscillation plane is provided. Inclined oscillation plane thus signifies that the normal of the oscillation plane is inclined with respect to the Z-direction (machining direction or also feed direction of the tool and/or the workpiece).

In this way, the two oscillation components in the Y- and Z-direction are automatically, by means of a mechanically preselected design element, i.e. the inclined plane, simultaneous or synchronous, and both with regard to the oscillation amplitudes and the oscillation frequencies and in particular the oscillation phases. In contrast with the first mentioned embodiment, separate means do not therefore have to be provided in order to keep constant phase relationships between two separate oscillations of two oscillation components, since the two oscillation components along the axes are replaced by one oscillation component along the inclined oscillation plane defined above.

Oscillation element 4 can additionally produce an oscillation in the X-direction, in particular simultaneously with the oscillation due to oscillation elements 2' and 3'.

The oscillation generated by oscillation elements 2', 3' advantageously does not comprise an oscillation component in the X-direction.

Compared with the embodiment according to FIG. 1, the embodiment with an inclined plane has the advantage that two oscillation components, i.e. those in the Y- and Z-direction in the example shown in FIG. 2, are provided with an identical oscillation amplitude, oscillation phase and oscillation frequency, whereas in the embodiment according to FIG. 1 an exact control or regulation of oscillation elements 2 and 3 would have to be provided.

The angle of the inclined plane is in particular freely selectable, preferably between 20° and 70° to the X-direction or to the X-Y plane. According to the invention, this can be achieved in particular by the fact that oscillation elements 2' and 3' can be swivelled towards one another and can be locked at a specific adjustable angle. A variation of the inclination of the plane and therefore a variation of the orientation of the oscillation component is thus possible. The control takes place via the control device.

Figure 4A:
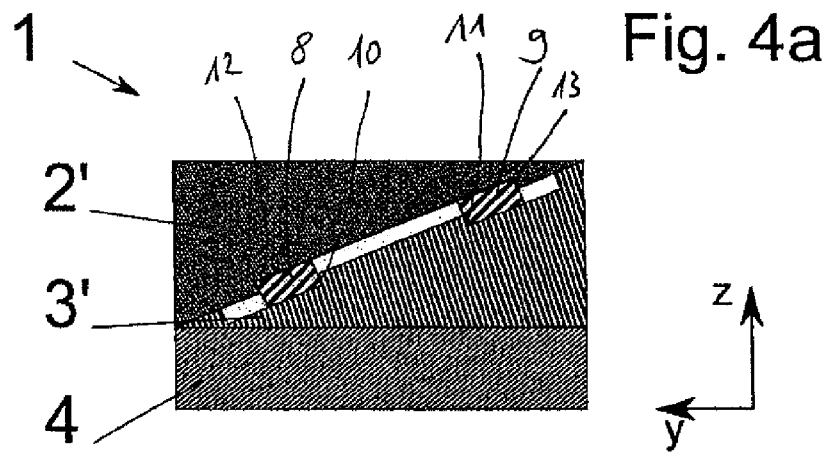
Figure 4B:
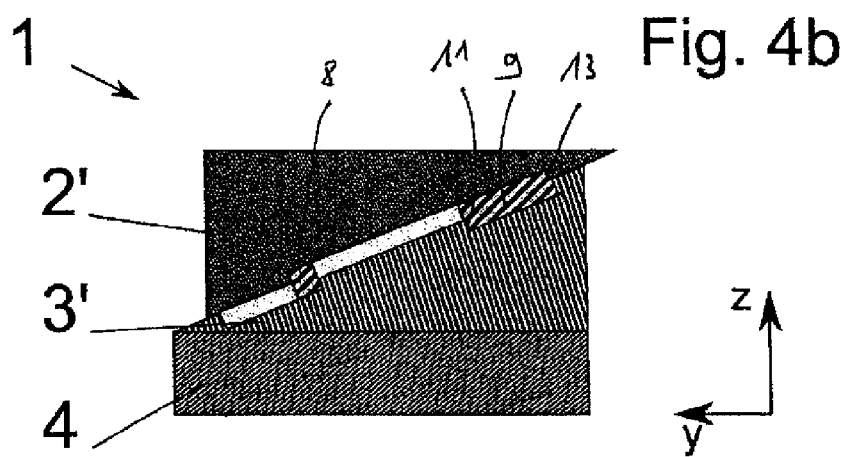
Figure 4C:
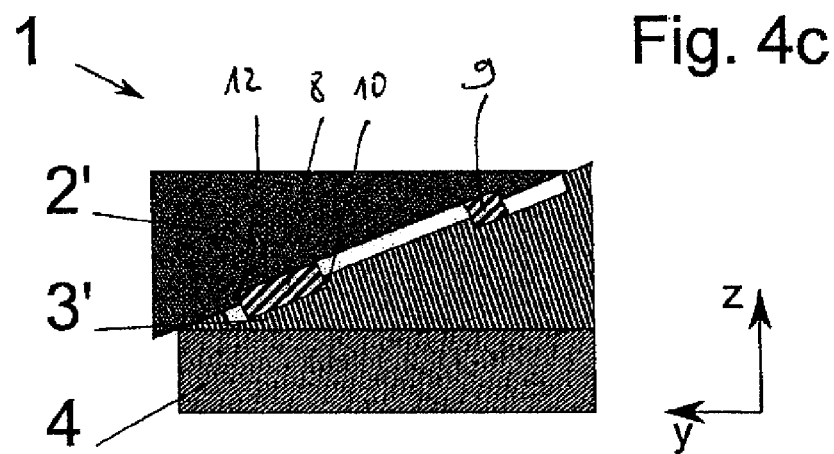

The mode of functioning of the generation of oscillation components by the movement of oscillation elements 2' and 3' by means of piezo elements 8, 9 is represented in the representation shown in FIGS. 4a to 4c. In the shown embodiment, oscillation element 2' is guided in a sliding manner with respect to oscillation element 3', and more precisely along an inclined plane, in particular at an angle of 20° with respect to the X-Y plane.

In FIG. 4a, the two piezo elements 8, 9 are in an initial position, in particular in an unstressed position. Piezo element 8 lies in the direction of piezo element 9 against a stop 10 of oscillation element 3'. Piezo element 9 lies in the direction of piezo element 8 against a corresponding stop 11 of oscillation element 3'.

According to FIG. 4b, an expansion of piezo element 9 is brought about by activation of piezo element 9, so that piezo element 9 rests against stop 11 and, lying opposite, against a stop 13 of oscillation element 2' and thus displaces oscillation element 2' along oscillation element 3'. Piezo element 8 is accordingly compressed between stop 10 and a stop 12 of oscillation element 2' disposed opposite the latter.

The opposite applies when piezo element 8 is activated according to FIG. 4c.

As an embodiment of the invention, provision can be made for the oscillation component in the Z-direction to be introduced by an oscillation element provided on tool 6. This can be provided as an alternative to oscillation element 2 or cumulatively.

An oscillation element 2 analogous to oscillation element 2 according to the first embodiment is provided in the embodiment shown in FIG. 3. Instead of oscillation elements 3, 4 for the oscillations in the X- and Y-direction, an oscillation element 7 is provided with which an oscillation component can be generated in a rotational direction, wherein rotational axis A is disposed in particular in the Z-direction. Rotational axis A preferably coincides with a rotational axis of tool 6', which here is advantageously a drill.

The oscillation amplitudes and/or oscillation frequencies of oscillation elements 2, 2', 3, 3', 4, 7 can be adjusted individually by means of a control device, in order to adjust the optimum oscillation amplitude or oscillation frequency for the given workpiece 5.

In order to be able to machine workpiece 5, additional motors are required, which are not represented and with which a relative movement between workpiece holding fixture 1 and tool 6 is brought about. Such motors preferably operate virtually vibration-free. The motors can be installed in such a way that they drive workpiece holding fixture 1 and/or tool 6.

The present invention is therefore independent of the type of tool 6, its movement direction, angle of attack, frequency etc. By means of the additional multi-axial, preferably simultaneous oscillation component introduced with the aid of the oscillation phases, oscillation frequencies and oscillation amplitudes, shattering of the microstructures, in particular in the case of ultra-hard materials, is brought about in the micrometer range, indeed even in the nanometer range. Tool 6 is coated in particular with hard or ultra-hard materials, in particular a diamond coating, wherein the individual diamond crystals, which project from the surface of tool 6, act as micro-/nano-structured micro-/nano chisels.

LIST OF REFERENCE NUMBERS

1 workpiece holding fixture
2, 2' oscillation element
3, 3' oscillation element
4 oscillation element
5 workpiece
6 tool
7 oscillation element
8 piezo element
9 piezo element
10 stop
11 stop
A rotational axis
X X-direction
Y Y-direction
Z Z-direction Having described the invention, the following is claimed:

1. A device for the machining of a workpiece comprising:
   a tool holding fixture for receiving a tool;
   a workpiece holding fixture for receiving the workpiece, said workpiece holding fixture; and
   a plurality of oscillation elements for providing oscillation components, including at least a first oscillation component in a Z-direction and a second oscillation component in an X-direction and/or a Y-direction, the oscillation components provided by the plurality of oscillation elements combine to generate an inclined oscillation component comprised of oscillation components simultaneously produced (i) in the X-direction and the Y-direction or (ii) in the X-direction and the Z-direction or (iii) in the Y-direction and the Z-direction, with respect to a machining direction or a feed direction of the tool or the workpiece, wherein the plurality of oscillation elements, which provide the oscillation components that generate the inclined oscillation component, include respective inclined planar surfaces.

2. The device according to claim 1, wherein the inclined oscillation component is generated by a mechanical construction element having a predetermined inclined plane.

3. The device according to claim 2, wherein oscillation frequencies of the oscillation components are adjustable to frequency <1 GHz.

4. The device according to claim 3, wherein the oscillation frequencies are adjustable to frequencies between 100 Hz to 600 Hz.

5. The device according to claim 2, wherein oscillation amplitudes of the oscillation components are adjustable to an amplitude <100 μm.

6. The device according to claim 5, wherein the oscillation amplitudes are adjustable to amplitudes <10 μm.

7. The device according to claim 1, wherein the oscillation components are adjusted simultaneously with regard to their respective oscillation phases and/or oscillation frequency and/or oscillation amplitudes.

8. The device according to claim 1, wherein the oscillation components are generated by piezo elements.

9. The device according to claim 1, wherein the oscillation components are provided through an axis-related, oscillation damping and/or an axis-related, oscillation excitation.

10. The device according to claim 1, wherein
    said oscillation components are provided by the plurality of oscillation elements during machining, said plurality of oscillation elements guided against one another during relative movement of the oscillation elements to generate the inclined oscillation component comprised of oscillation components simultaneously produced (i) in the X-direction and the Y-direction or (ii) in the X-direction and the Z-direction or (iii) in the Y-direction and the Z-direction.

11. The device according to claim 1, wherein the second oscillation component is provided by rotation of an oscillation element in an X-Y plane extending in the X-direction and the Y-direction.

12. The device according to claim 1, wherein the oscillation components of the inclined oscillation component have the same oscillation frequencies, oscillation amplitudes, and oscillation phases.

13. Method for machining a workpiece comprising:
    receiving a tool on a tool holding fixture;
    receiving the workpiece on a workpiece holding fixture;
    providing a plurality of oscillation elements to provide oscillation components, including at least a first oscillation component in a Z-direction and a second oscillation component in an X-direction and/or a Y-direction;
    providing relative movement of the plurality of oscillation elements during machining to provide the oscillation components by guiding the plurality of oscillation elements against each other to generate an inclined oscillation component comprised of oscillation components simultaneously produced (i) in the X-direction and the Y-direction or (ii) in the X-direction and the Z-direction or (iii) in the Y-direction and the Z-direction, with respect to a machining direction or a feed direction of the tool or the workpiece, wherein the plurality of oscillation elements, which are guided against each other to generate the inclined oscillation component, include respective inclined planar surfaces.

14. The method according to claim 13, wherein the oscillation components of the inclined oscillation component have the same oscillation frequencies, oscillation amplitudes, and oscillation phases.

* * * * *